United States Patent [19]
Van Doren et al.

[11] Patent Number: 5,733,096
[45] Date of Patent: Mar. 31, 1998

[54] MULTI-STAGE TELESCOPING STRUCTURE

[75] Inventors: Matthew J. Van Doren, Pleasanton, Calif.; Alexander H. Slocum, Concord, N.H.; Don Sauer, San Jose, Calif.

[73] Assignee: Silicon Valley Group, Inc., San Jose, Calif.

[21] Appl. No.: 527,798

[22] Filed: Sep. 13, 1995

[51] Int. Cl.$^6$ ............................................. G25J 18/04
[52] U.S. Cl. .................. 414/744.3; 74/89.15; 212/296; 212/348; 414/744.5; 901/15; 901/23
[58] Field of Search .................. 414/744.5, 744.3, 414/728; 52/118; 403/109; 74/89.15; 901/15, 23, 16; 212/296, 348

[56] References Cited

U.S. PATENT DOCUMENTS

| | | | |
|---|---|---|---|
| 4,566,847 | 1/1986 | Maeda et al. | 901/23 X |
| 4,635,492 | 1/1987 | Uebelhart | 74/89.15 |
| 4,749,327 | 6/1988 | Roda | 901/16 X |
| 4,793,197 | 12/1988 | Petrovsky | 403/109 X |
| 4,818,175 | 4/1989 | Kimura | 74/89.15 X |
| 4,904,153 | 2/1990 | Iwasawa et al. | |
| 5,114,302 | 5/1992 | Meisser et al. | |

OTHER PUBLICATIONS

Van Doren, Matthew J., Precision Machine Design for the Semiconductor Equipment Manufacturing Industry, Massachusetts Institute of Technology, May 1995.

*Primary Examiner*—Donald W. Underwood
*Attorney, Agent, or Firm*—William B. Walker

[57] ABSTRACT

A multi-stage telescoping tube structure and a robot including a multi-stage telescoping tube structure. The multi-stage telescoping tube structure includes an outer tube, an intermediate tube, and an inner tube. The intermediate tube is slidably received in the outer tube, and the inner tube is slidably received in the intermediate tube. It further includes a multi-stage screw for arrangement translating rotary motion into linear movement of the tubes, and a drive means coupled to the screw arrangement. The robot further includes a support bracket, rotatably supporting the multi-stage telescoping tube structure, and an electric motor for rotating the arrangement. The structure further includes rail guides engagable with complimentary horizontally extending rails for horizontal movement of the robot.

8 Claims, 13 Drawing Sheets

MULTI-STAGE TELESCOPING STRUCTURE

FIELD OF THE INVENTION

This invention relates to a telescoping tube structure and to a robot making use of a telescoping tube structure.

BACKGROUND OF THE INVENTION

As modern manufacturing plants become increasingly mechanized and work space becomes more cluttered, the need for a versatile, yet compact, robot becomes essential. A particular advantage provided by the use of robots is that of improved cleanliness in the workplace. For instance, in the manufacture of semiconductor devices such as Very Large Scale Integration devices and Integrated Circuits it is essential that dust particles be kept to a minimum, since the yield of semiconductor devices is directly influenced by the workroom atmosphere. Accordingly, semiconductor devices are typically processed in clean rooms, using robots to perform various wafer handling functions. The process modules in a typical semiconductor manufacturing plant are stacked vertically, and the space between the various workplaces is usually limited. It is therefore desirable to create a wafer handling robot that maintains maximum flexibility to perform the required operations, while occupying a minimum amount of space. U.S. Pat. No. 4,904,153 to Iwasawa discloses a robot arm that includes an outer tubular frame and an inner telescoping tube. The vertical extension of such a single stage telescoping tube, however, cannot be increased without increasing the length of the frame and telescoping tube.

OBJECTS AND SUMMARY OF THE INVENTION

It is an object of the invention to provide a multi-stage telescoping tube structure that is compact yet provides a substantial increase in length when propelled from its collapsed to its extended state.

According to the invention there is provided a multi-stage telescoping tube structure comprising: a base tube; two telescoping concentric tubes slidably received in the base tube; a multi-stage screw arrangement connected to the tubes for translating rotary motion into linear movement of the telescoping tubes; and a motor connected to the multi-stage screw arrangement, wherein the multi-stage screw arrangement includes a hollow threaded outer shaft having a proximal end and a distal end, the motor being connected to the proximal end of the outer shaft to impart rotary motion to the outer shaft; a first nut threadedly engaged with the outer shaft and secured to the outer tube; a second nut secured to the distal end of the outer screw; and a threaded inner shaft threadedly engaged with the second nut and having a proximal end and a distal end, the distal end of which is secured to the inner tube.

The drive means can be an electric motor, and the multi-stage screw arrangement can be a multi-stage ball screw.

The multi-stage telescoping tube structure can further comprise a stand-off tube secured to the outer tube and sized to slidably receive the electric motor for axial sliding movement of the motor in the stand-off tube. Typically the first nut is secured to the stand-off tube.

The multi-stage telescoping tube arrangement can further comprise a first rail and a first complimentary bearing connected to respective ones of the outer and intermediate tubes; and a second rail and a second complimentary bearing connected to respective ones of the intermediate and inner tubes, so as to constrain the tube movements to linear movement. A first pair of rails can be secured to an inner wall of the outer tube, and a second pair of rails can be secured to an inner wall of the intermediate tube, and complimentary bearings can be secured to outer walls of the intermediate and inner tubes, respectively, to engage the rails on the respective outer and intermediate tubes.

The motor typically includes a position sensor and a fail-safe brake.

Further, according to the invention, there is provided a robot comprising: a multi-stage telescoping tube structure that includes an outer tube; an intermediate tube slidably received in the outer tube and linearly constrained relative to the outer tube to prevent rotary motion of the intermediate tube relative to the outer tube; an inner tube slidably received in the intermediate tube and linearly constrained relative to the intermediate tube to prevent rotary motion of the inner tube relative to the intermediate tube; the robot further comprising a support bracket having bearings for rotatably supporting the multi-stage telescoping tube structure.

The robot can include a multi-stage screw arrangement for translating rotary motion into linear movement of the intermediate tube and inner tube, wherein the multi-stage screw arrangement includes a hollow threaded outer shaft having a proximal end and a distal end, the motor being connected to the proximal end of the outer shaft to impart rotary motion to the outer shaft; a first nut threadedly engaged with the outer shaft and secured to the outer tube; a second nut secured to the distal end of the outer shaft; and a threaded inner shaft threadedly engaged with the second nut and having a proximal end and a distal end, the distal end of which is secured to the inner tube.

The robot typically includes an electric motor for rotating the multi-stage telescoping tube structure relative to the support bracket.

The robot can further include rail engaging rail guides engagable with complimentarily horizontally extending rails for horizontal movement of the robot.

DETAILED DESCRIPTION OF THE INVENTION

The wafer handling robot in accordance with the invention has a multi-stage telescoping tube structure having a large vertical extension. The structure consists of three concentric tubes defining a base tube and two linearly moveable stages. The linear stages are propelled by a multi-stage screw arrangement driven by a motor as is described in greater detail below. This provides for axial extension of the linear stages along their longitudinal axes. In addition, provision is made to rotate the multi-stage telescoping tube structure about its longitudinal axis, and to move the structure linearly, perpendicular to the longitudinal axis. While the invention will be described specifically with respect to a wafer processing robot, it will be appreciated that the concepts are equally applicable to any robotic arrangement in a mechanized manufacturing plant.

Figures 1, 4:
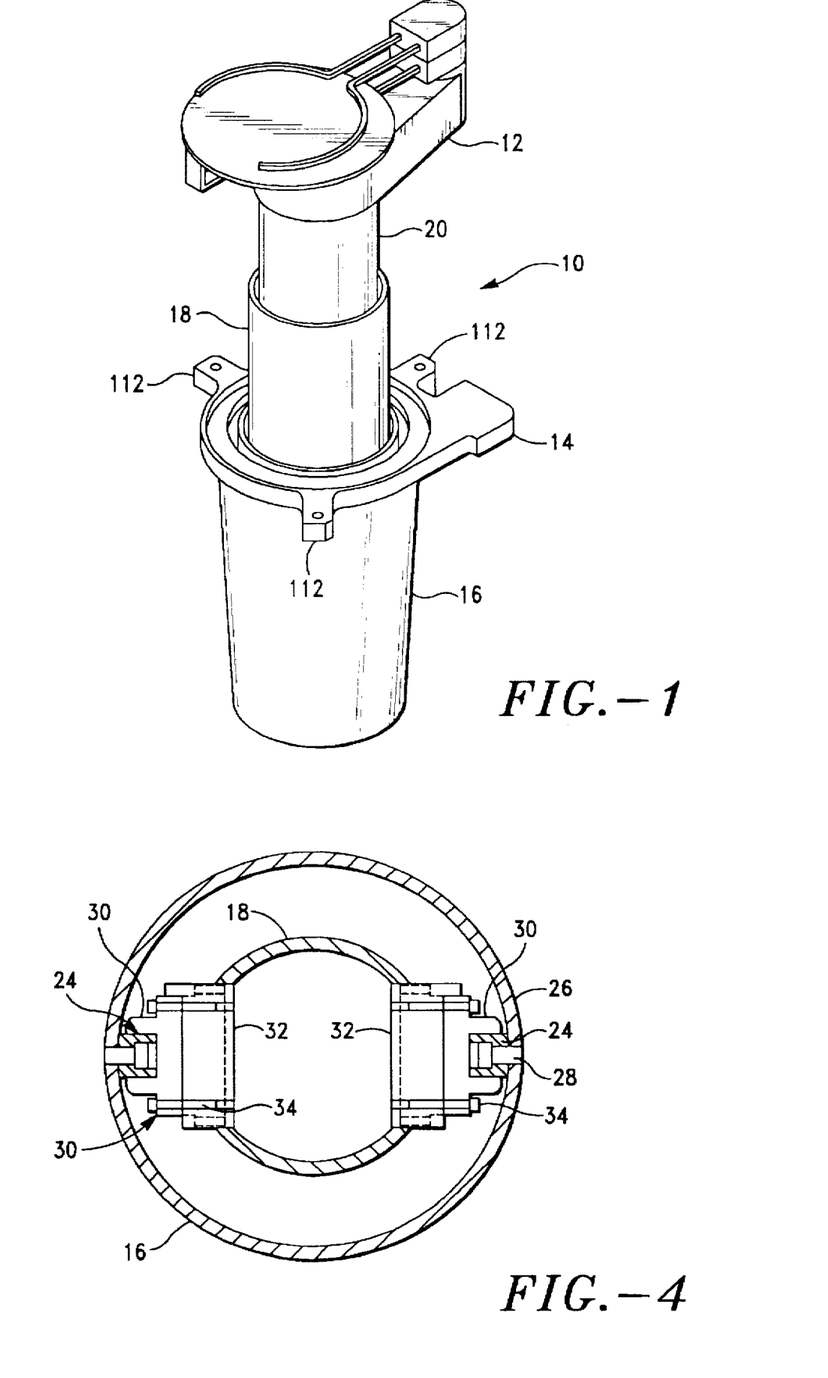
FIG. 1 is an isometric view of a robot showing a multi-stage telescoping tube structure.
FIG. 4 is a top view of the outer and intermediate tubes illustrated in FIG. 3.

FIG. 1 illustrates the multi-stage telescoping tube structure 10 in which an arm 12 is connected to the upper end of the tube structure 10. The multi-stage telescoping tube structure comprises an outer, base tube 16, an intermediate tube 18 and an inner tube 20. The tubes 18, 20 are axially moveable between a collapsed position and an extended position. The entire tube structure is rotatably mounted on a support bracket 14 as is described in greater detail below.

Figure 2:
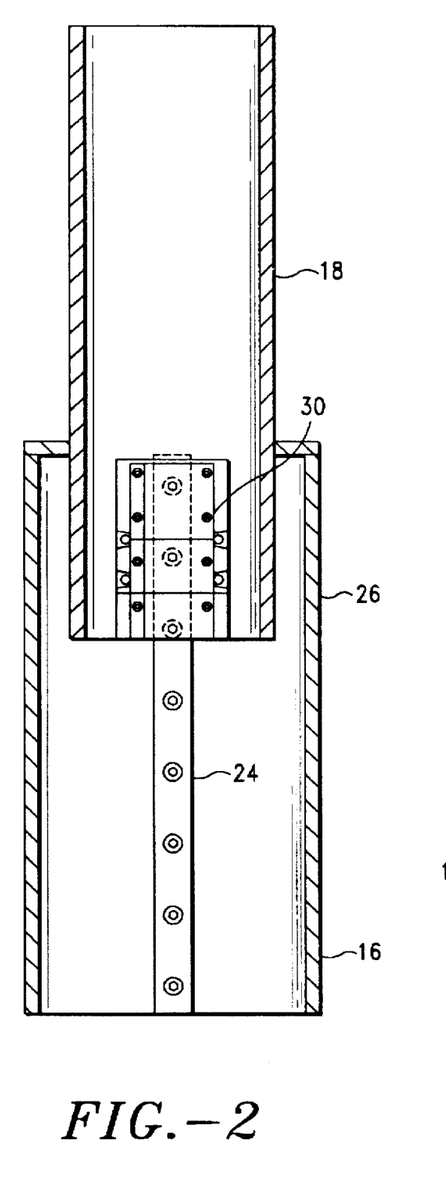
FIG. 2 is a sectional front view of the outer tube and intermediate tube forming part of the multi-stage telescoping tube structure.
Figure 3:
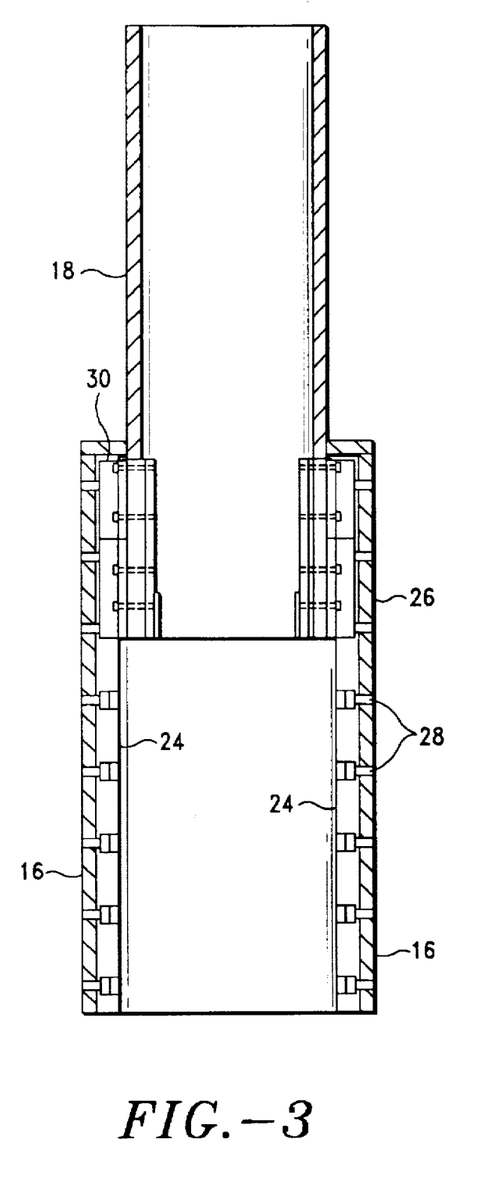
FIG. 3 is a sectional side view of the outer and intermediate tubes of FIG. 2.

FIG. 2 is a sectional side view of the base tube 16 and the intermediate tube 18, constituting the first stage. The diameter of the intermediate tube is smaller than that of the base tube 16 to allow the intermediate tube 18 to be received in the base tube 16. A pair of vertically extending bearing rails 24 are bolted, by means of bolts 28, to the inner surface of the base tube wall 26. The bolts 28 are received in recesses in the rails 24 and extend into the wall 28, as illustrated in FIGS. 3 and 4. Complimentary, U-shaped bearing cars 30 engage the rails 24. Referring to FIGS. 3 and 4, cut-out portions are defined in the intermediate tube 18. Connector blocks 32 are received in the cut-out portions and secured to the intermediate tube 18. The bearing cars 30 are bolted, by means of bolts 34, to the connector blocks 32 to secure the bearing cars 30 to the intermediate tube 18. Since the rails 24 are secured to the outer tube 16 and are engaged by the bearing cars 30, the intermediate tube 18 is linearly constrained relative to the outer, base tube 16 to prevent rotation of the intermediate tube 18 relative to the base tube 16. The intermediate tube 18 is thus mounted to be linearly movable within the base tube 16.

Figure 5:
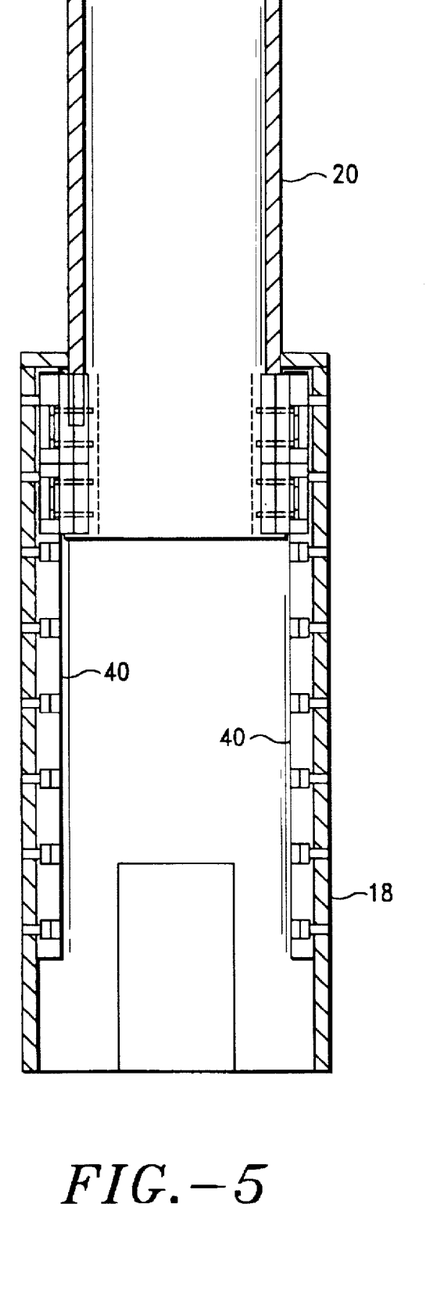
FIG. 5 is a sectional front view of the intermediate tube and inner tube forming part of the multi-stage telescoping tube structure.
Figure 6:
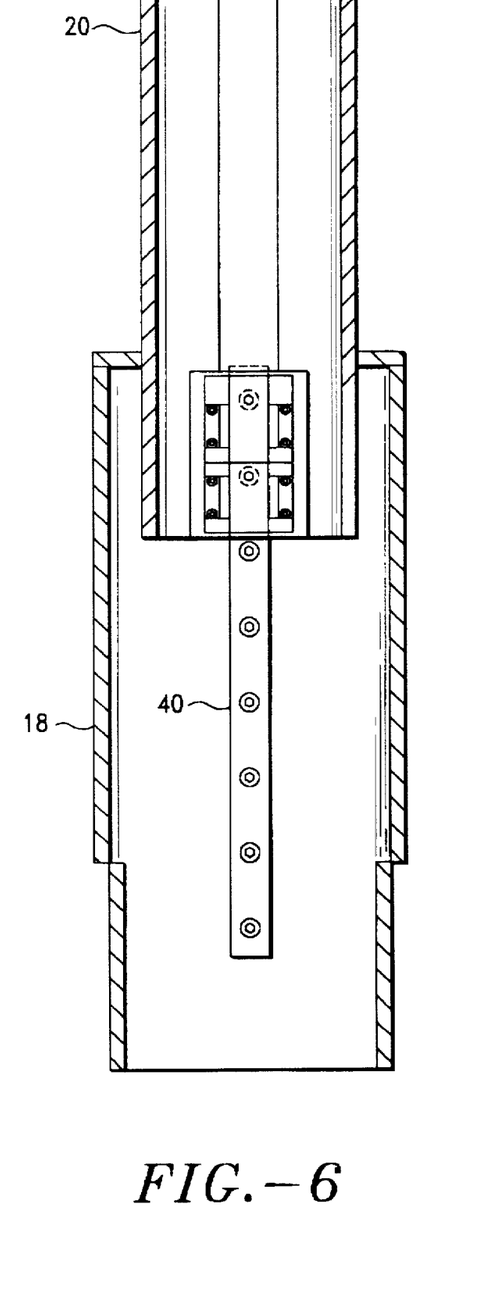
FIG. 6 is a sectional side view of the intermediate and inner tubes of FIG. 5.
Figure 7:
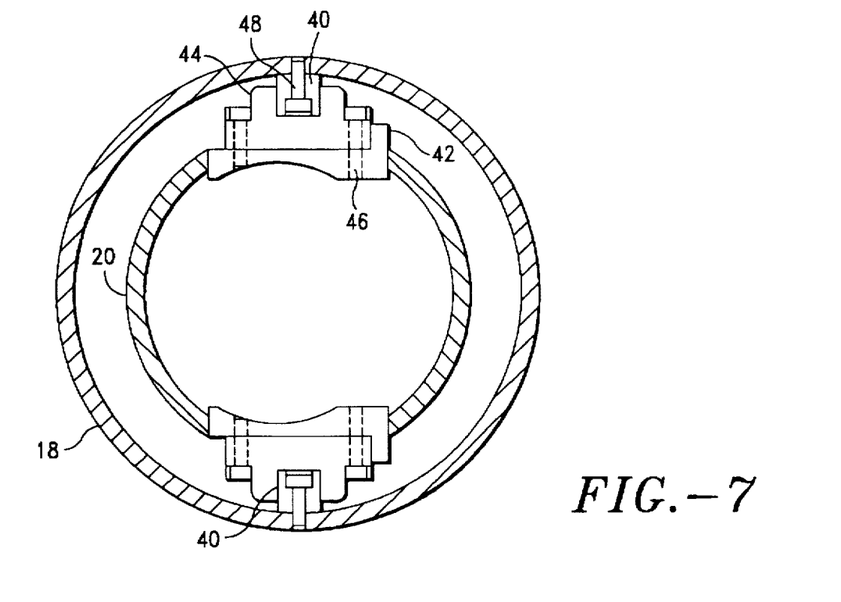
FIG. 7 is a plan view of the intermediate and inner tubes illustrated in FIG. 6.

FIGS. 5-7 illustrate the intermediate tube 18 and the inner tube 20. FIG. 5 is a front view of tubes 18 and 20, illustrating a pair of vertically extending rails 40 bolted to an inner surface of the intermediate tube. The rails 40 are secured in a manner similar to that described for the rails 24 except that the rails 40 are displaced by 90 degrees relative to the rails 24. Referring to FIG. 7, connector blocks 42 are secured to the inner tube 20 in complimentary recesses at the lower end of the inner tube 20. Bearing cars 44 are secured to the blocks 42 by means of bolts 46. The bearing cars 44 have a U-shaped configuration to complimentarily engage the rails 40. Like the bolts 28 illustrated in FIG. 4, the bolts 48 securing the rails 40 to the intermediate tube 18 are received in recesses in the rails 40 to avoid interference with the bearing cars 44 and the rails 40. The rail-and-bearing arrangement between the intermediate tube 18 and the inner tube 20 linearly constrains the movement of the inner tube 20 relative to the intermediate tube 18 to avoid rotation of the inner tube 20 relative to the intermediate tube 18.

Figure 8:
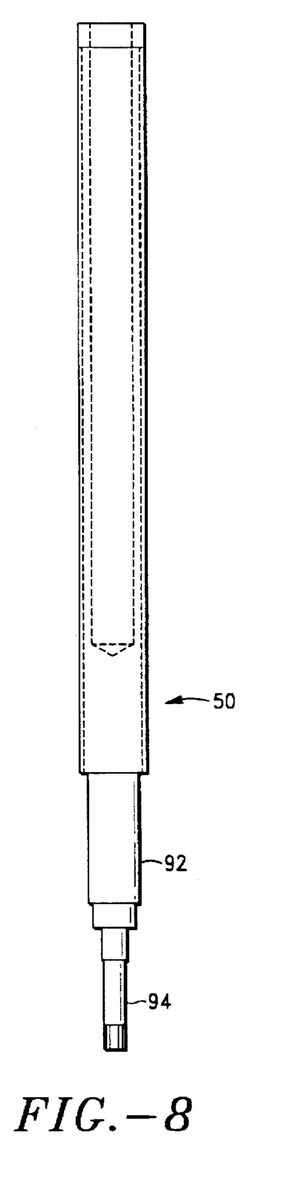
FIG. 8 is a side view of a hollow, threaded outer shaft of a multi-stage screw arrangement for use in the robot of the present invention.
Figures 9, 10:
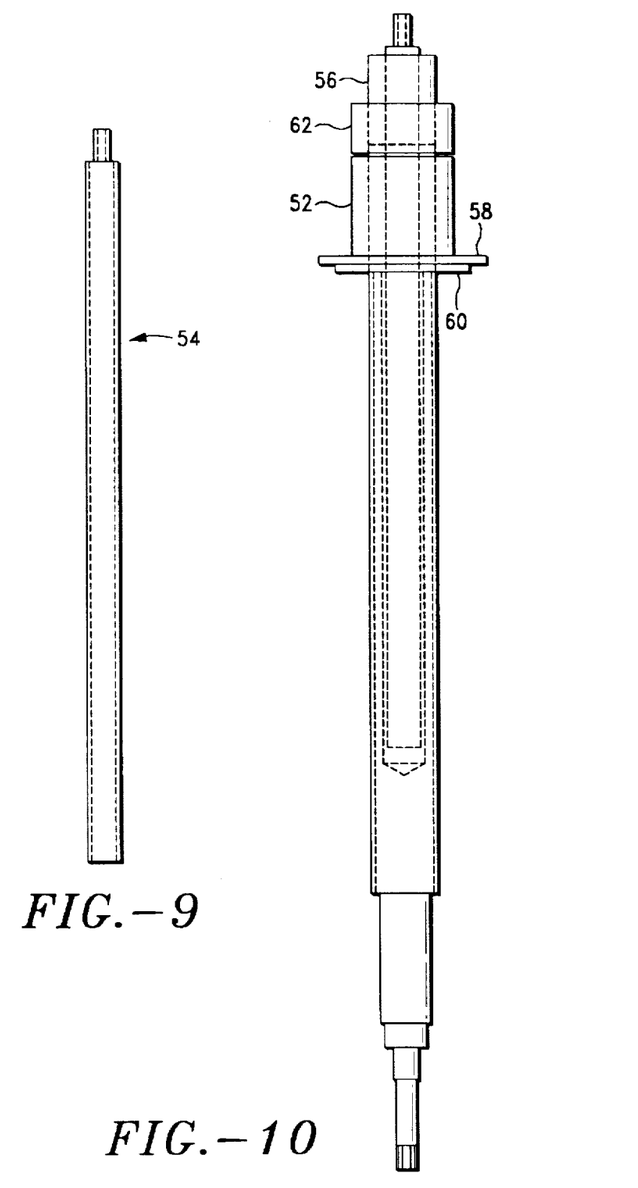
FIG. 9 is a side view of a threaded inner shaft forming part of the multi-stage screw arrangement.
FIG. 10 is a front view of the multi-stage screw arrangement and a bracket for securing the screw arrangement to a stand-off tube of the robot.
Figure 11:
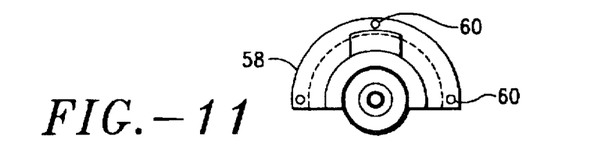
FIG. 11 is a plan view of the bracket illustrated in FIG. 10.

In order to propel the two stages relative to the base tube 16 a multi-stage screw arrangement, illustrated in FIGS. 8-10, is provided. The multi-stage telescoping screw arrangement comprises a hollow threaded outer shaft 50 illustrated in FIG. 8. The outer shaft 50 is externally threaded to engage a complimentary outer nut 52, illustrated in FIG. 10. The telescoping screw arrangement further includes an externally threaded inner shaft 54, illustrated in FIG. 9. The internal diameter of the hollow shaft 50 and the external diameter of the shaft 54 are such to allow the inner shaft 54 to be received in the outer shaft 50. This is illustrated in FIG. 10. The outer nut 52 is secured to a stand-off tube, as described in greater detail below. To achieve this, a semi-circular bracket 58 is secured to the outer nut 52, for example, by threadedly engaging the nut 52 or by being welded to the nut 52. The bracket 58 defines a flange for securing the outer nut 52 to the stand-off tube. The bracket 58 is illustrated in plan view in FIG. 11 and includes three axially extending holes 60 for bolts (not shown) to secure the bracket 58 to the stand-off tube. The bracket 56 thus firmly secures the outer nut 52 to the stand-off tube.

Figure 12:
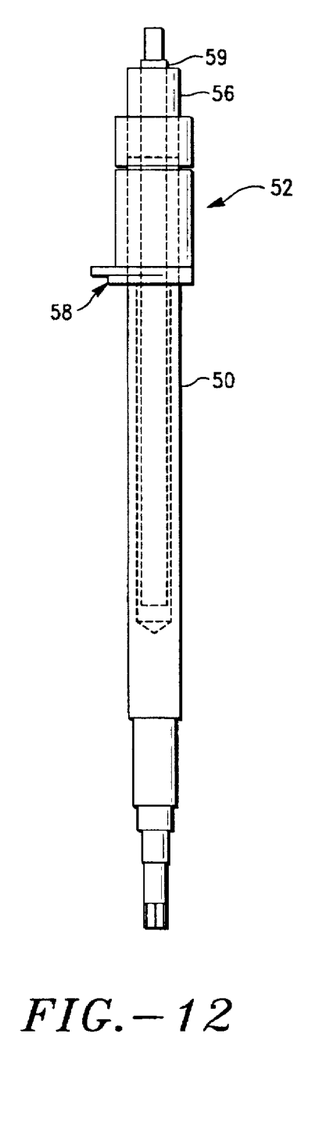
FIG. 12 is a sectional side view of the multi-stage screw arrangement and bracket of FIG. 10.
Figure 13:
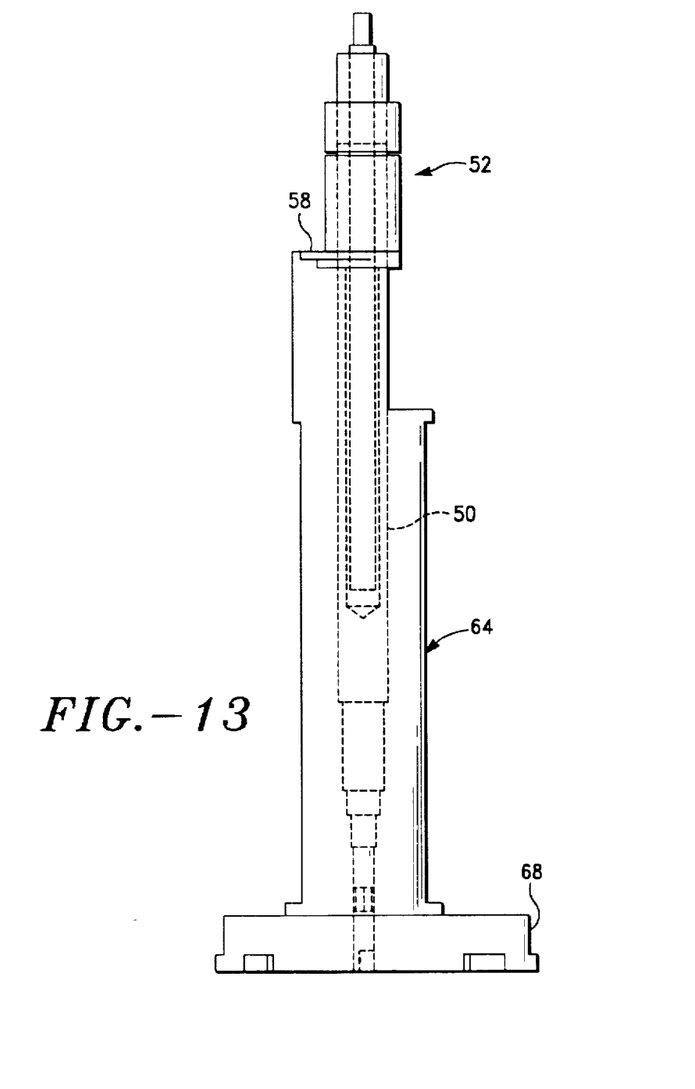
FIG. 13 is a sectional side view of the arrangement of FIG. 12, connected to the stand-off tube which is mounted on a tube base.

FIG. 12 illustrates the screw arrangement with the bracket 58 from the side, clearly showing the semi-circular flange extending outwardly to one side. The semi-circular shape of the flange permits electrical wiring to pass along the side of the shaft 50 once the arrangement is assembled, as illustrated in FIG. 13. It also accommodates serve motors (not shown) in the arm 12 (FIG. 1).

An inner nut 56 engages the threaded inner shaft 54, and is secured to the outer shaft 50 by means of a collar 62 which threadedly engages the shaft 50. The collar 62 is connected to the inner nut 56 by means of complementary threads on the nut 56 and the collar 62. In another embodiment (not shown), the collar 62 is dispensed with, and the nut 56 is electron beam welded directly to the shaft 50.

Preferably a ball screw arrangement is used, in which the nuts 52, 56 include ball bearings to reduce friction between the nuts and the complimentary threads of the shafts 50, 54, respectively.

Figure 14:
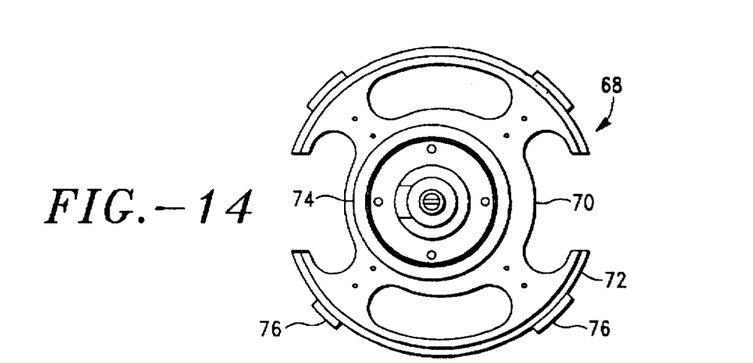
FIG. 14 is a plan view of the screw arrangement, stand-off tube, and tube base of FIG. 13.
Figure 15:
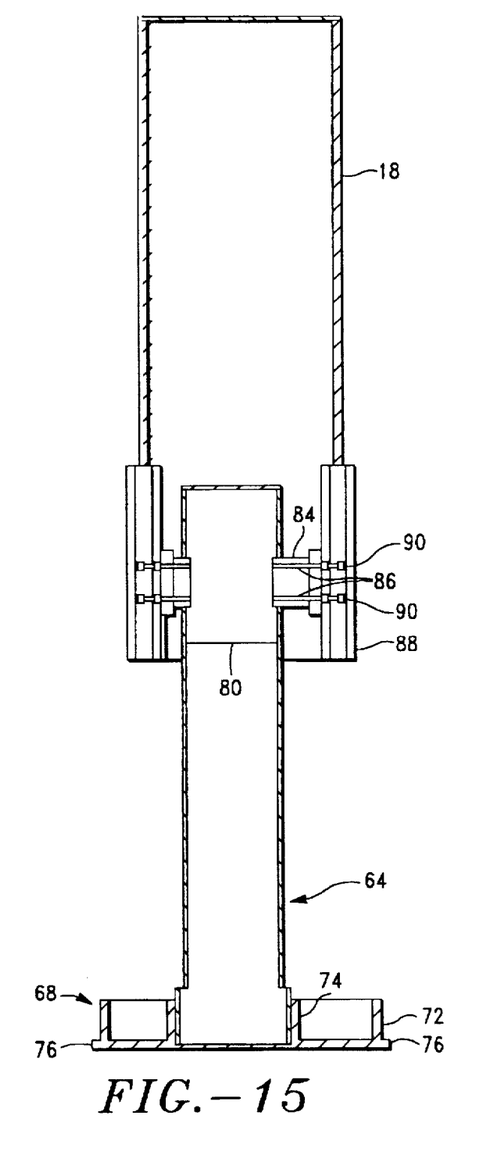
FIG. 15 is a sectional side view of the tube base, stand-off tube, and intermediate tube with its vertical drive motor assembly.

Referring to FIG. 13, since the outer nut 52 is bolted to the stand-off tube 64 by means of the bracket 58, a reference point for the screw arrangement is established. The stand-off tube 64 is mounted on a base plate 68, that is subsequently secured to the base tube 16, as described below. The base plate 68 is illustrated in plan view in FIG. 14. It includes a floor 70 and upwardly extending walls 72. A cup-like support 74 extends upwardly from the floor 70 to receive the lower portion of the stand-off tube 64, as illustrated in FIG. 15. The base plate 68, further includes radially outwardly extending tabs 76, as illustrated in FIGS. 14 and 15. The tabs 76 support the lower edge of the base tube 16, as discussed below. Since the stand-off tube 64 and base tube 16 are firmly secured to each other by means of the base plate 68, the outer nut 52 will be immovably mounted relative to the outer base tube 16. The stand-off tube therefore has the function of firmly securing the outer nut 52 to the base tube 16.

The manner in which the tube structure is extended, can best be described with reference to FIG. 10. The screw arrangement provides two telescoping sections relative to the outer nut 52. As the outer shaft 50 is rotated about its vertical axis it moves linearly upwardly relative to the stationary outer nut 52. The smaller inner nut 56 is firmly secured to the upper end of the outer shaft 50 and thus moves upwardly with the outer shaft 50. Since the nut 56 engages the external threads of the inner shaft 54, the inner shaft 54 also moves upwardly with the hollow outer shaft 50 and the inner nut 56. As the outer shaft 50 and inner nut 56 move upwardly, they rotate about their longitudinal axes. The inner shaft 54 has a thread that is opposite to the thread of the outer shaft 50. By linearly constraining the movement of the inner shaft 54 to prevent its rotation, linear propulsion of the inner shaft 54 is produced by the rotation of the inner nut 56. This is achieved by the rail and bearing car arrangements described in FIGS. 2–4 and FIGS. 5–7 which prevent rotation of the inner tube 20 relative to the intermediate tube 18 and the base tube 16.

Figure 16:
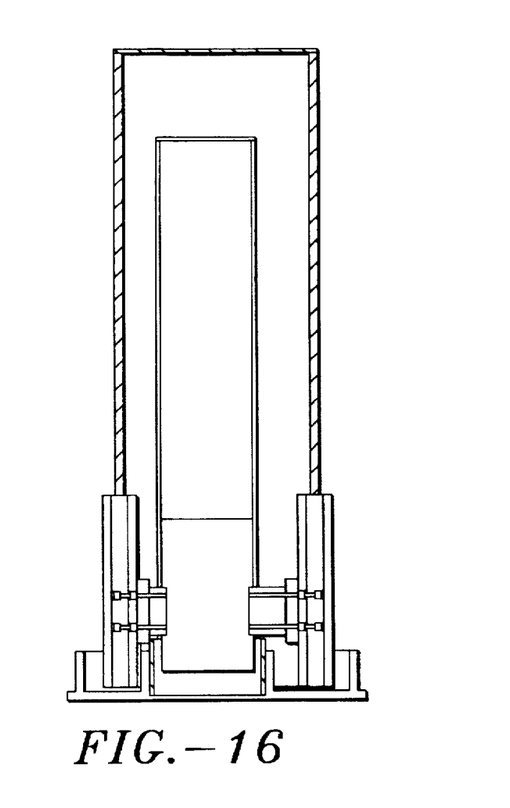
FIG. 16 is a sectional side view of the arrangement of FIG. 15 in its collapsed state.
Figure 17:
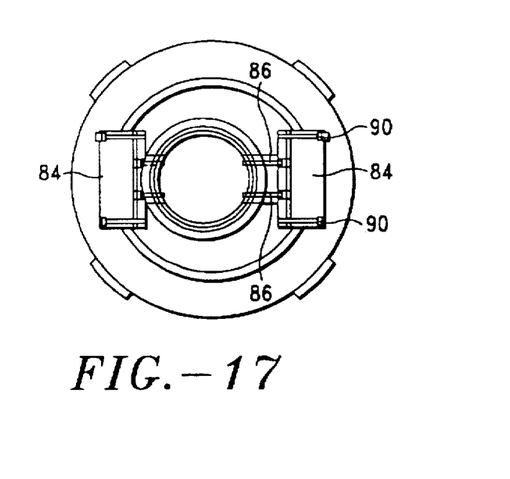
FIG. 17 is a plan view of the arrangement of FIG. 15.

Rotation of the outer shaft 50 is achieved by means of a vertical drive motor assembly 80, illustrated in FIGS. 15–17. The vertical drive motor assembly 80 is received in the stand-off tube 64. The motor assembly 80 is connected to the intermediate tube 18 by means of motor attachment brackets 84. Bolts 86 extend through the brackets 84, into the motor assembly 80. The brackets 84 are, in turn, bolted to connector blocks 88 by means of bolts 90. The motor assembly 80 thus moves vertically with the intermediate tube 18. To facilitate this vertical movement, slots (not shown) extend vertically along opposite sides of the stand-off tube 64 to accommodate the motor attachment brackets 84.

Figure 18:
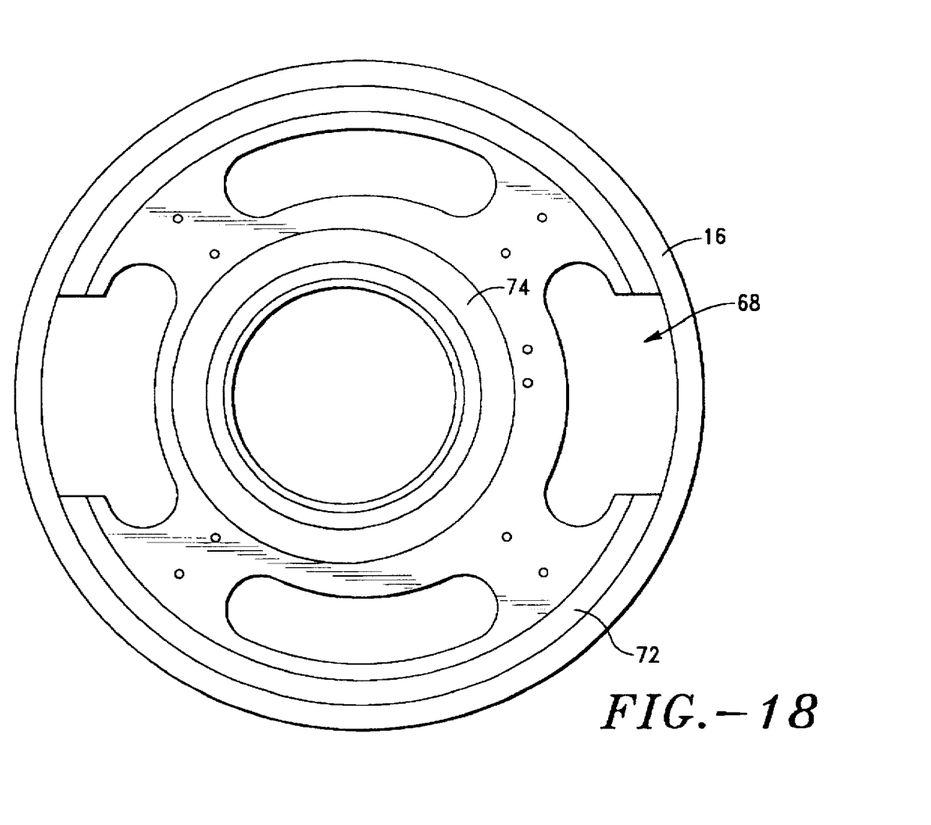
FIG. 18 is a plan view of the tube base connected to the outer tube.
Figure 19:
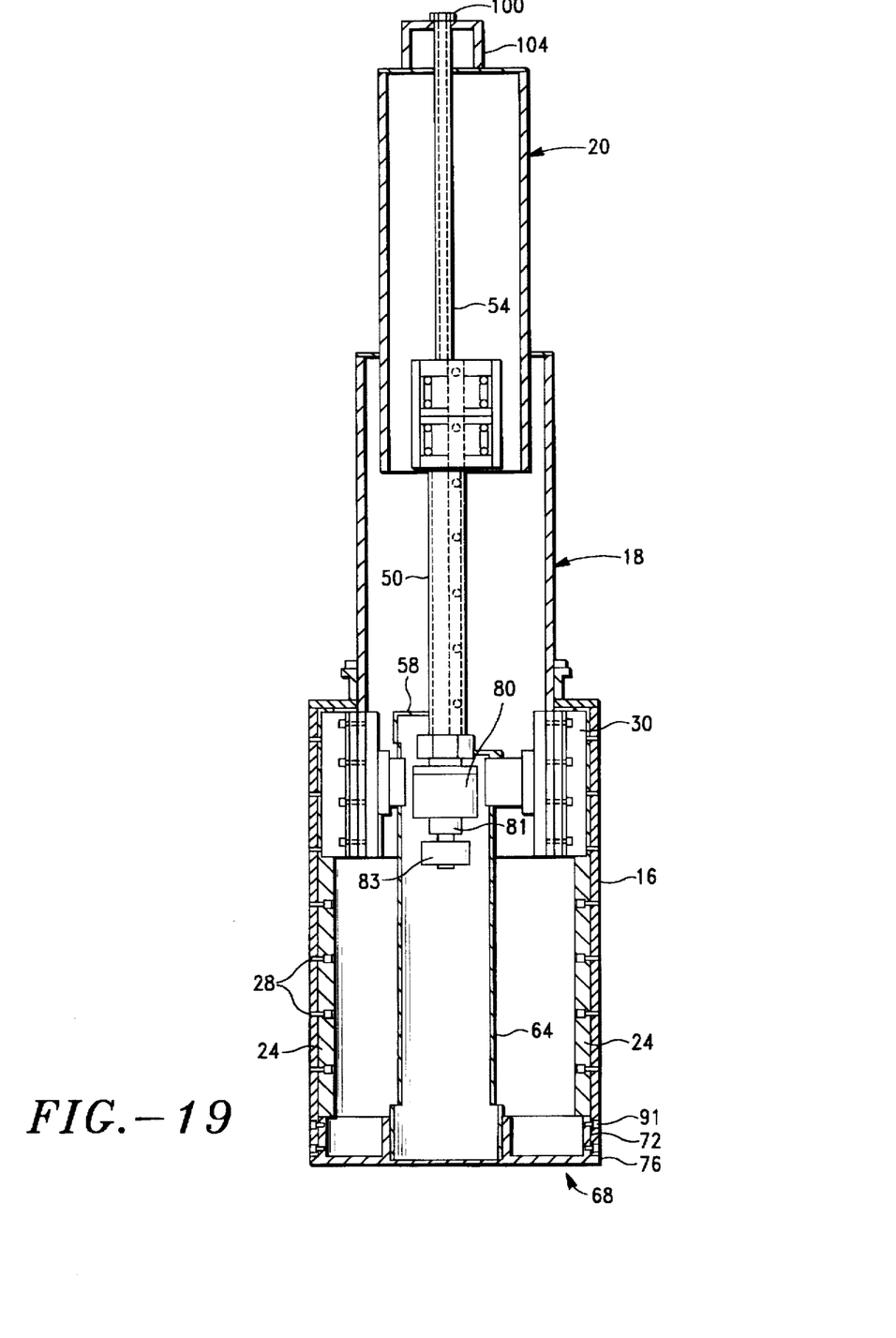
FIG. 19 is a sectional side view of the tube structure, multi-stage screw arrangement and motor assembly of the robot.

FIG. 18 is a plan view of the base plate 72 connected to the outer, base tube 16. As is illustrated in FIG. 19, the outer tube 16 rests with its lower edge on the tabs 76. The outer tube 16 is secured to the base plate 68 by means of bolts 91 extending radially into the flange portions 72. It will be seen from FIGS. 15–18 that the stand-off tube 64 is not co-axially aligned with the base tube 16. The reason for this is to provide a more suitable path for electrical wiring. As illustrated in FIG. 13, the upper end of the stand-off tube 64 has a stepped configuration to allow ready access to wiring extending along the side of the shaft 50, within the stand-off tube 64. Referring again to FIG. 8, it is seen that the threaded outer shaft 50 has a first stepped section 92, and a second stepped section 94. The motor assembly 80, illustrated in FIG. 15 is built around the section 94, the section 94 constituting the motor shaft of the motor assembly 80. The motor assembly 80, thus serves to rotate the threaded outer shaft 50 when the multi-stage telescoping tube structure is assembled, as illustrated in the sectional side view of FIG. 19. The motor assembly 80 typically includes a conventional position sensor 81 and a fail-safe brake 83.

The upper end of the shaft 54 is firmly secured to the inner tube 20 by means of a nut 100 connected to an inverted cup section 104 that is secured to the inner tube 20. The nut 100 engages a complimentarily threaded end portion 102 of the shaft 54. In operation, the motor assembly 80 rotates the outer shaft 50. As mentioned above, the outer nut (not shown in FIG. 19) is immovably secured relative to the base tube 16 by means of the bracket 58 connected to the stand-off tube 64. The motor assembly 80 and outer shaft 50 thus move upwardly relative to the outer nut. Since the motor assembly 80 is connected to the intermediate tube 18, the intermediate tube 18 moves up with the motor assembly 80 and outer shaft 50. The intermediate tube 18 is prevented from rotating relative to the base tube 16 by the bearing cars 30, which engage the rails 24. Rotation of the outer shaft 50 also rotates the inner nut (not shown), which threadedly engages the inner shaft 54. The inner shaft is secured to the inner tube 20, which is linearly constrained by the rail and bearing car arrangement described with respect to FIGS. 5–7 (not illustrated in FIG. 19). Rotation of the inner nut thus causes the inner shaft 54 and the inner tube 20 to be propelled linearly relative to the intermediate tube 18.

Figure 20:
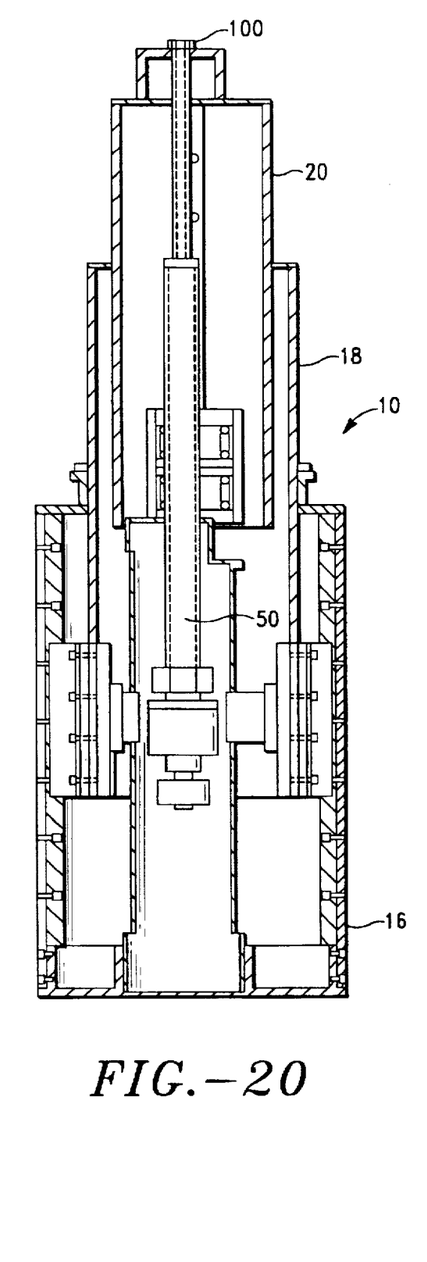
FIG. 20 is a sectional side view of the arrangement of FIG. 19, showing the arrangement in a partially extended state.

FIG. 20 illustrates the telescoping tube structure 10 in a partially extended state. The rotation of the outer shaft 50 has caused the first and second stages, constituted by the intermediate tube 18 and inner tube 20 to move upwardly relative to the base tube 16. Simultaneously, the inner tube 20 has moved linearly upwardly relative to the intermediate tube 18.

Figure 21:
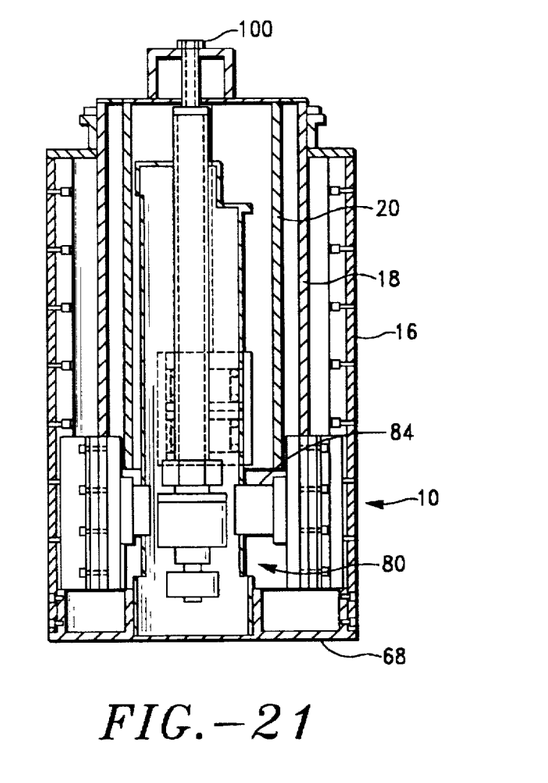
FIG. 21 is a sectional side view of the arrangement of FIG. 19 showing the arrangement in a collapsed state.
Figure 22:
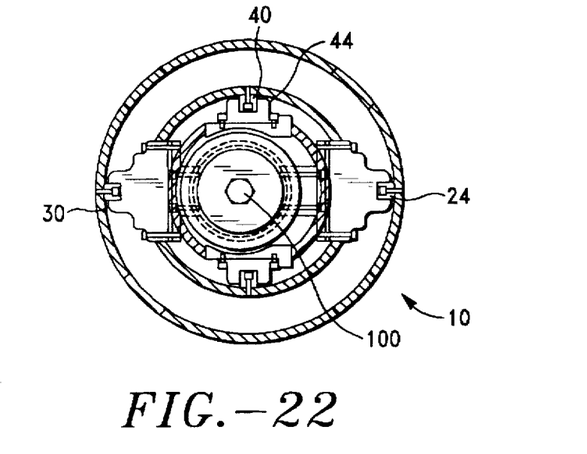
FIG. 22 is a sectional plan view of the arrangement of FIG. 19.

FIG. 21 illustrates the telescoping tube structure 10 in its collapsed state. The three tubes 16, 18, 20 are concentrically nested within each other. The intermediate tube 18 with its motor assembly 80 rests on the base plate 68. The inner tube 20 is nested within the intermediate tube 18, the lower edge of the inner tube 20 being located just above the motor attachment brackets 84 extending inwardly from the intermediate tube 18. FIG. 22 shows the tube structure 10 in plan view, showing the relative spacing of the rails 24, 40.

Figure 23:
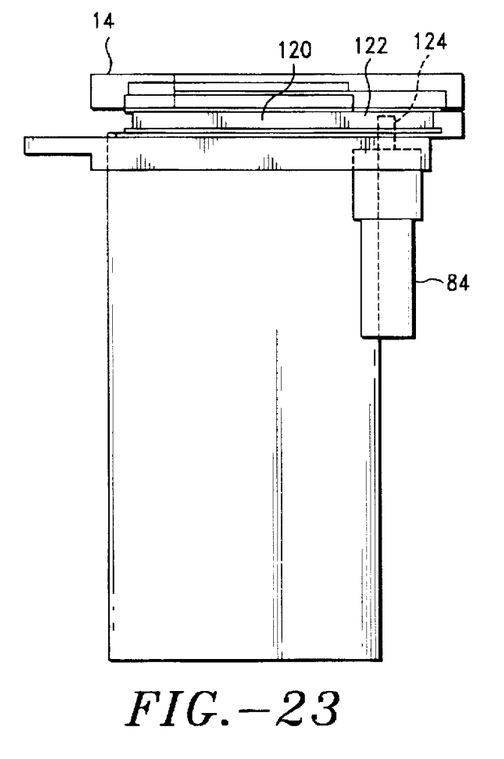
FIG. 23 is a front view of an outer tube of the telescoping tube structure, showing the rotation assembly.
Figure 24:
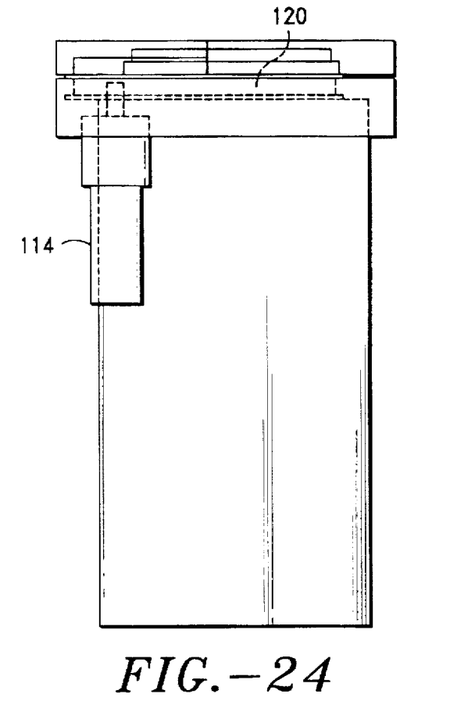
FIG. 24 is a side view of the arrangement of FIG. 23.
Figure 25:
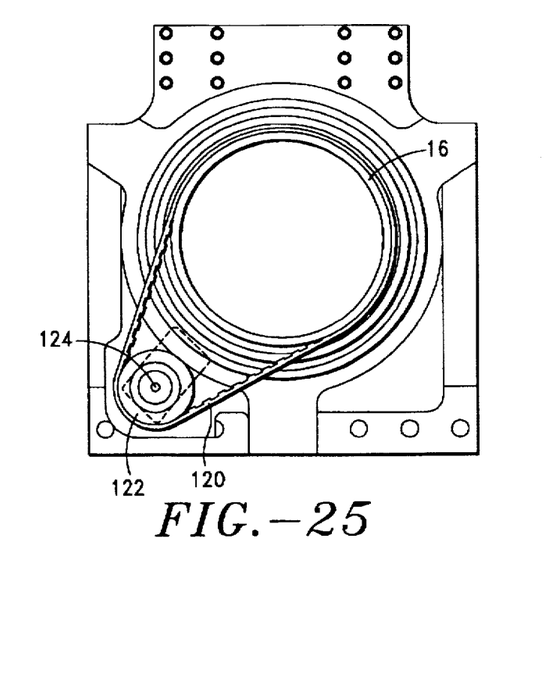
FIG. 25 is a plan view of the arrangement illustrated in FIG. 24.
Figure 26:
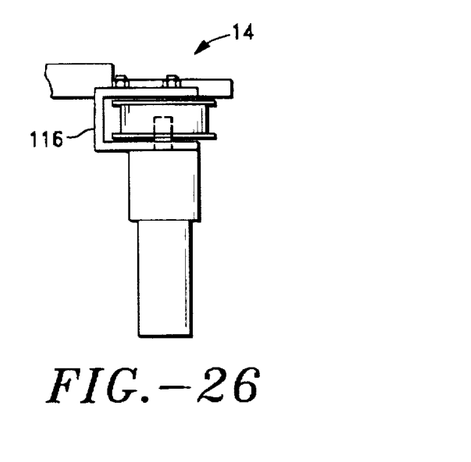
FIG. 26 is a side view of a motor and its connector arrangement, forming part of the rotation assembly.
Figure 27:
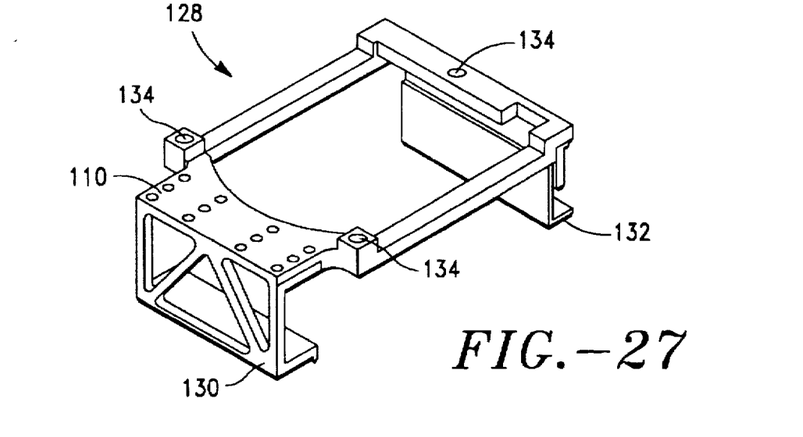
FIG. 27 is an isometric view of the horizontal carriage of the robot.
Figure 28:
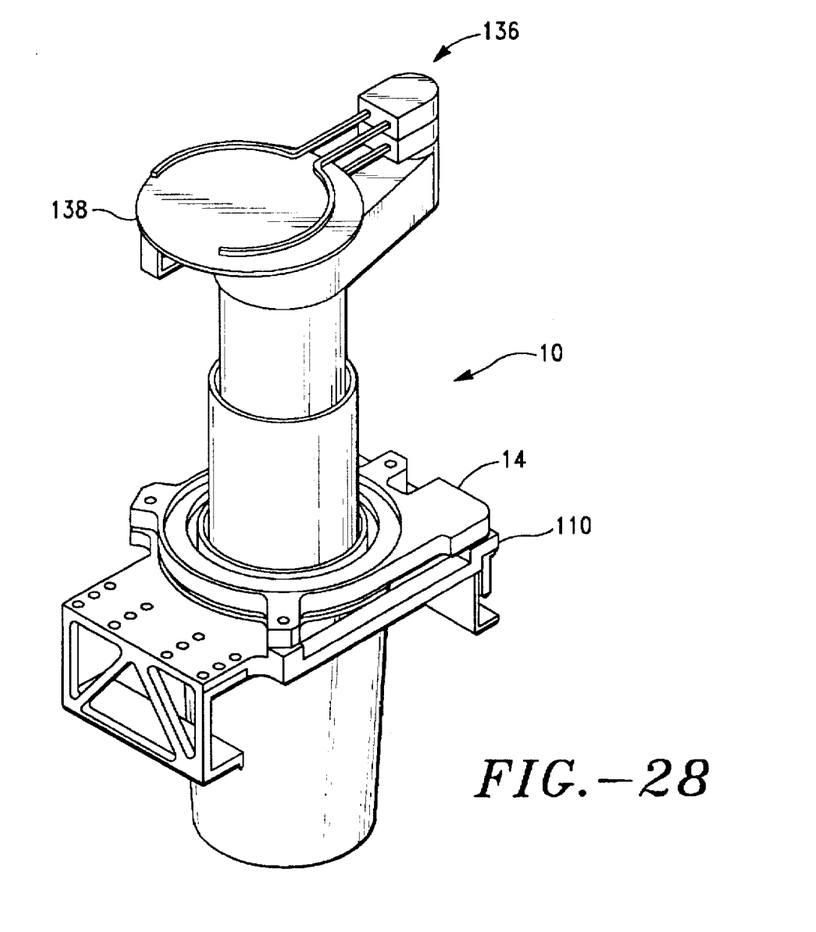
FIG. 28 is an isometric view of the robot with its horizontal carriage.
Figure 29:
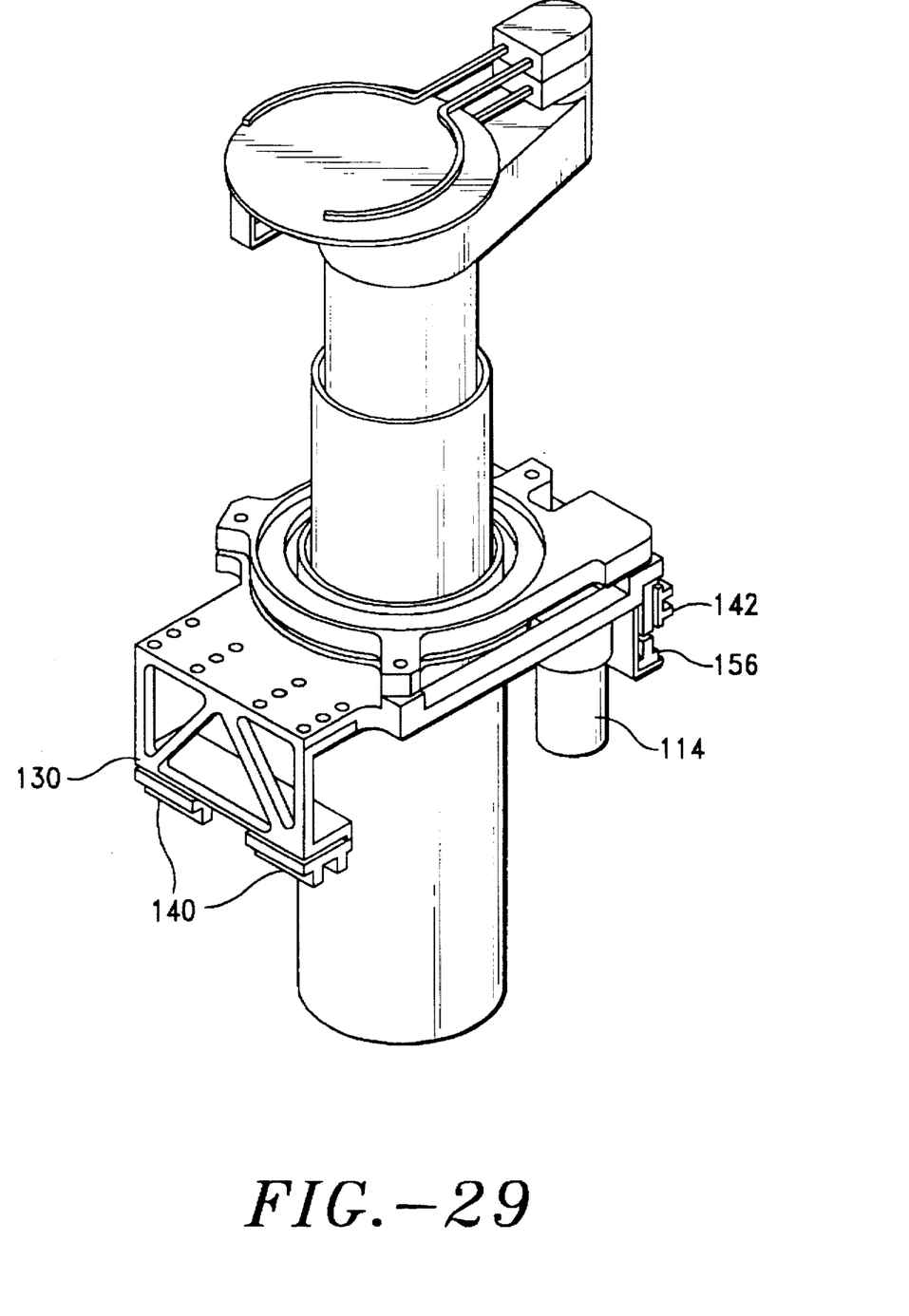
FIG. 29 is an isometric view of the robot with its carriage showing guides attached to the horizontal carriage.
Figure 30:
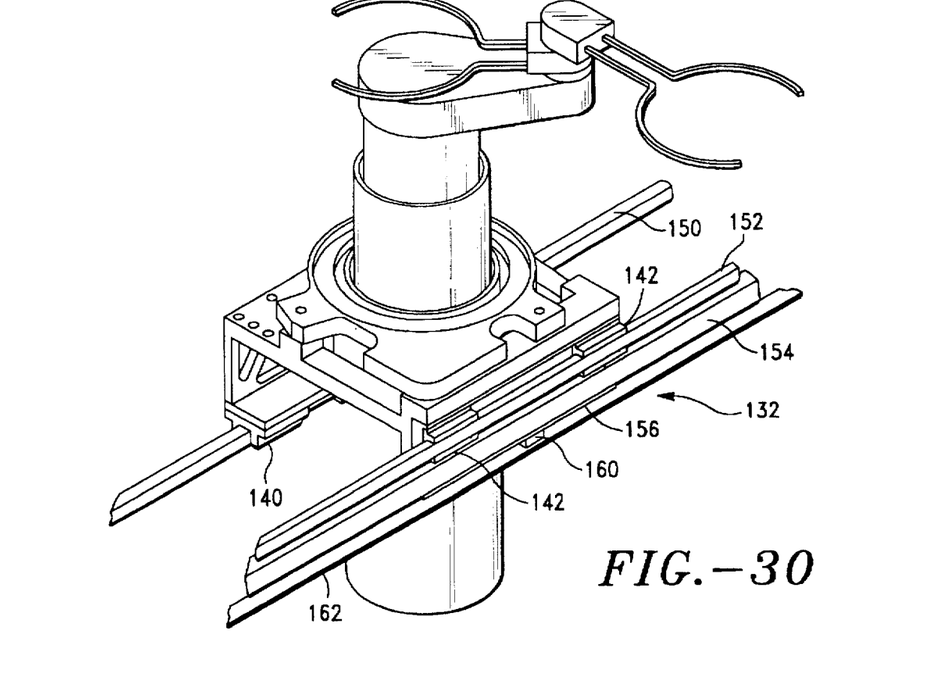
FIG. 30 is an isometric view of the robot mounted on a set of rails.
Figure 31:
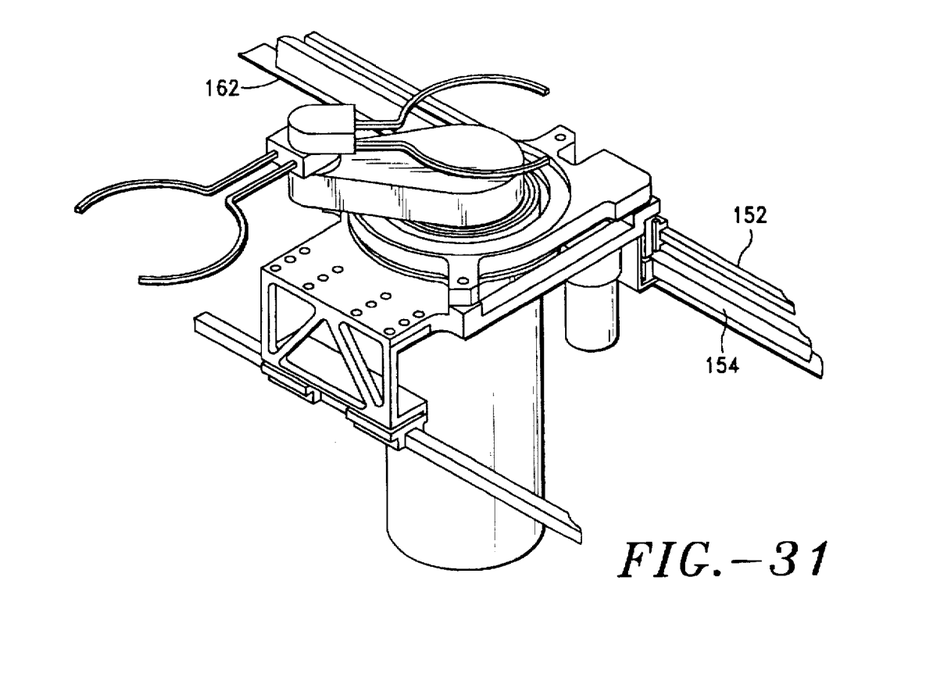
FIG. 31 is an isometric view of the robot of FIG. 30 showing the robot from the opposite side.

FIGS. 23–26 show that the entire multi-stage telescoping tube structure is mounted to be rotatable about its longitudinal axis. The support bracket 14 (also shown in FIG. 1) rotatably supports the outer tube 16 on bearings (not shown). A bracket 110 for a horizontal carriage (not shown) is connected to the support bracket 14 by means of a kinematic coupling arrangement which includes three alignment elements mounted on the lower side of bracket 14 at locations 112 in FIG. 1. An electric motor 114 is bolted to a mounting bracket 116 as illustrated in FIG. 26, which is, in turn, bolted to a portion of the support bracket 14. As illustrated in FIGS. 23 to 25, the motor 114 is mounted at one corner of the bracket 14 and includes a toothed drive belt 120. The belt 120 engages a pulley 122 secured to the drive shaft 124, and extends around the outer tube 16 so as to engage a complimentarily toothed pulley secured to the outer surface of the tube 16. Rotation of the drive shaft 124 thus rotates the entire multi-stage telescoping tube structure. The versatility of the robot illustrated in FIG. 1 is further enhanced by providing it with horizontal translational ability. This is achieved by means of the bracket 110 which forms part of a horizontal carriage 128, as illustrated in FIG. 27. A first U-shaped bracket 130 is bolted to one side of the bracket 110 and a second U-shaped bracket 132 is bolted to the opposite side of the bracket 110. The contact elements 134 engage their counterpart elements at locations 112 on the support bracket 14, thereby to define the kinematic coupling. Once the horizontal carriage is secured to the multi-stage telescoping tube structure 10 it adopts the configuration illustrated in FIG. 28. This shows a wafer gripping arrangement 136 connected to the telescoping tube arrangement 10, and gripping a wafer 138. As illustrated in FIG. 29, rail guides 140 and 142 are bolted to the U-shaped brackets 130 and 132. The guide 140 engages a horizontally extending rail 150 as illustrated in FIGS. 30 and 31, and the guide 142 engages a second horizontally extending rail 152. The robot is propelled horizontally along the rails 150, 152 by means of a linear motor comprising a linear magnet track 154 and a coil 156. An encoder head 160 reads information off a tape 162, and feeds information back to a controller to control the positioning of the robot.

It will be appreciated that the invention is not limited to the embodiment described above. Different configurations and embodiments can be developed without departing from the scope of the invention as defined by the claims. Also, as mentioned above, the application of the invention is not limited to the manufacture of semiconductors.

We claim:

1. A multi-stage telescoping tube structure comprising:
   a base tube;
   two telescoping concentric tubes comprising an intermediate tube and an inner tube slidably received in the base tube;
   a multi-stage screw arrangement connected to the tubes for translating rotary motion into linear movement of the telescoping tubes; and
   a motor connected to the multi-stage screw arrangement, wherein the multi-stage screw arrangement includes
   a hollow threaded outer shaft having a proximal end and a distal end, the motor being connected to the proximal end of the outer shaft to impart rotary motion to the outer shaft;
   a first nut threadedly engaged with the outer shaft and secured to the base tube;
   a second nut secured to the distal end of the outer shaft;
   a threaded inner shaft threadedly engaged with the second nut and having a proximal end and a distal end, the distal end of which is secured to the inner tube;
   a stand-off tube secured to the base tube and sized to slidably receive the electric motor for axial sliding movement of the motor in the stand-off tube;
   a first rail connected to one of the base and intermediate tubes, and a first complimentary bearing connected to the other one of the base and intermediate tubes; and
   a second rail connected to one of the intermediate and inner tubes, and a second complimentary bearing connected to the other one of the intermediate and inner tubes, so as to constrain the movement of the intermediate and inner tubes to linear movement.

2. A multi-stage telescoping tube structure of claim 1, wherein the motor is an electric motor, and the multi-stage screw arrangement is a multi-stage ball screw.

3. A multi-stage telescoping tube structure of claim 1 wherein the first nut is secured to the stand-off tube.

4. A multi-stage telescoping tube structure of claim 1 wherein a first pair of rails is secured to an inner wall of the base tube and a second pair of rails is secured to an inner wall of the intermediate tube, and complimentary bearings are secured to outer walls of the intermediate and inner tubes, respectively, to engage the rails on the respective outer and intermediate tubes.

5. A multi-stage telescoping tube structure of claim 1 wherein the motor includes a position sensor and a fail-safe brake.

6. A robot comprising:
   a multi-stage telescoping tube structure that includes
   an outer tube,
   an intermediate tube slidably received in the outer tube and means for linearly constraining the intermediate tube relative to the outer tube to prevent rotary motion of the intermediate tube relative to the outer tube,
   an inner tube slidably received in the intermediate tube and means for linearly constraining the inner tube relative to the intermediate tube to prevent rotary motion of the inner tube relative to the intermediate tube;
   a support bracket having bearings for rotatably supporting the multi-stage telescoping tube structure;
   a multi-stage screw arrangement connected to the tubes for translating rotary motion into linear movement of the intermediate tube and inner tube, wherein the multi-stage screw arrangement includes a hollow threaded outer shaft having a proximal end and a distal end, and motor means connected to the proximal end of the outer shaft for imparting rotary motion to the outer shaft;
   a first nut threadedly engaged with the outer shaft and secured to the outer tube;
   a second nut secured to the distal end of the outer shaft; and
   a threaded inner shaft threadedly engaged with the second nut and having a proximal end and a distal end, the distal end of which is secured to the inner tube.

7. A robot of claim 6, further comprising:
   an electric motor means connected to the multi-stage telescoping tube structure for rotating the multi-stage telescoping structure relative to the support bracket.

8. A robot of claim 6, further comprising rail engaging rail guides engagable with complimentary horizontally extending rails for horizontal movement of the robot.

* * * * *